Aug. 31, 1937. M. F. HILL 2,091,317
GEAR TOOTH CURVE
Filed Oct. 13, 1934 3 Sheets-Sheet 1
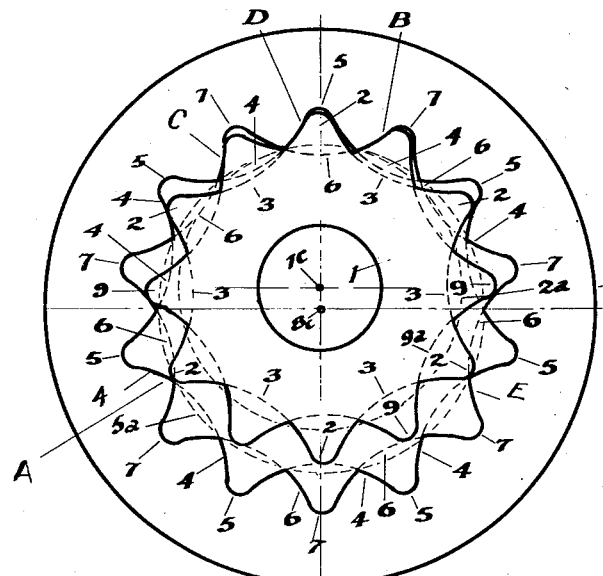
fig I
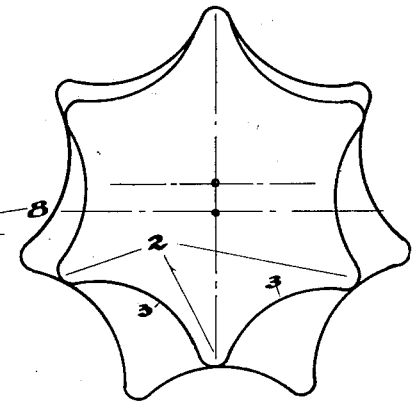
fig IA
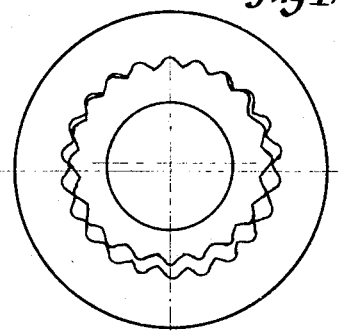
fig III
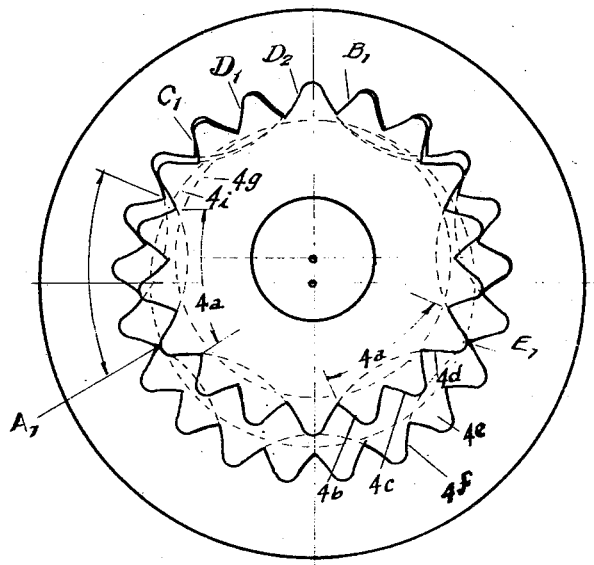
fig II
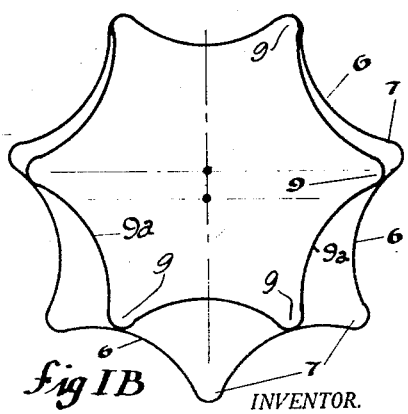
fig IB
INVENTOR.
Myron F. Hill

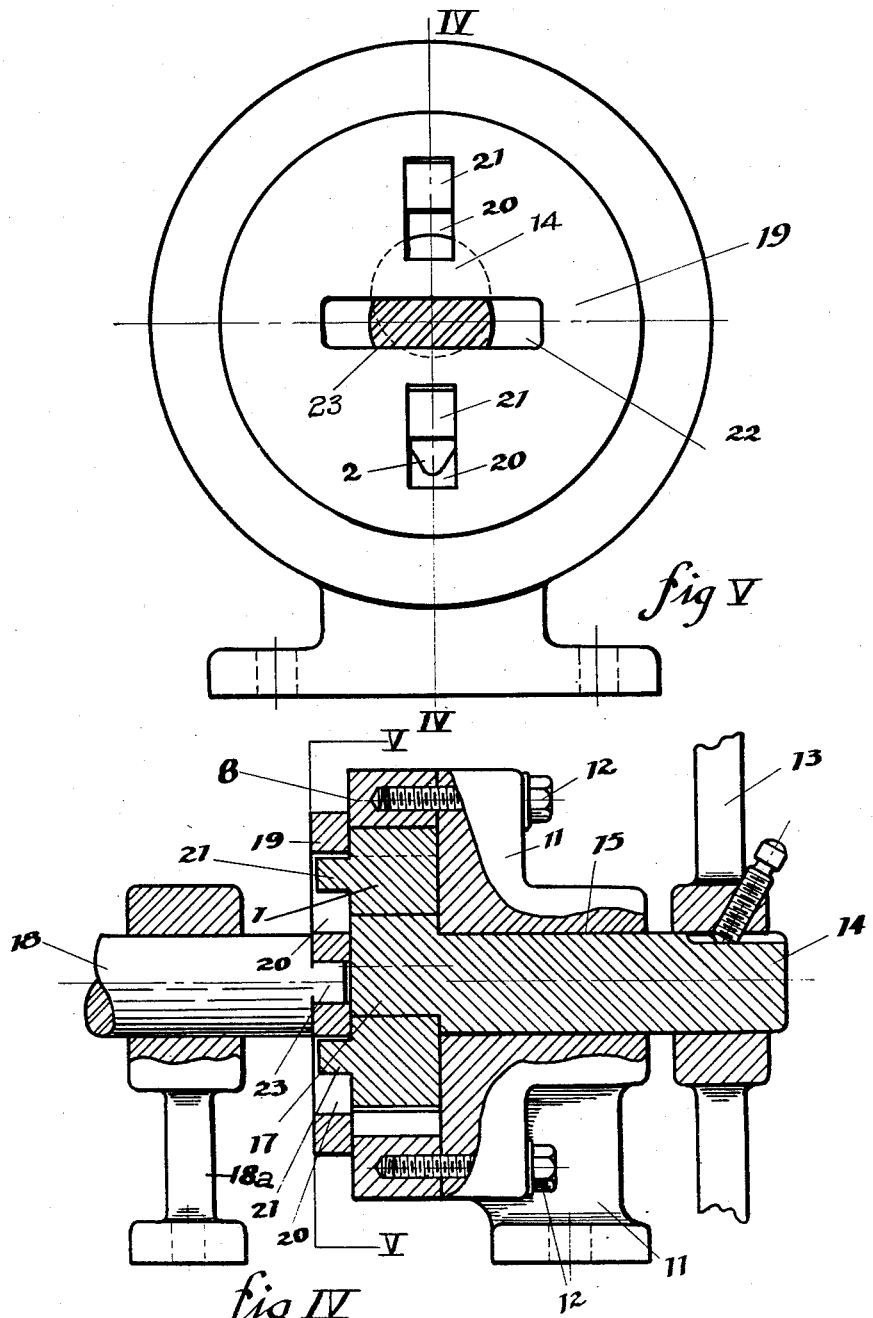

Aug. 31, 1937.  M. F. HILL  2,091,317
GEAR TOOTH CURVE
Filed Oct. 13, 1934  3 Sheets-Sheet 3
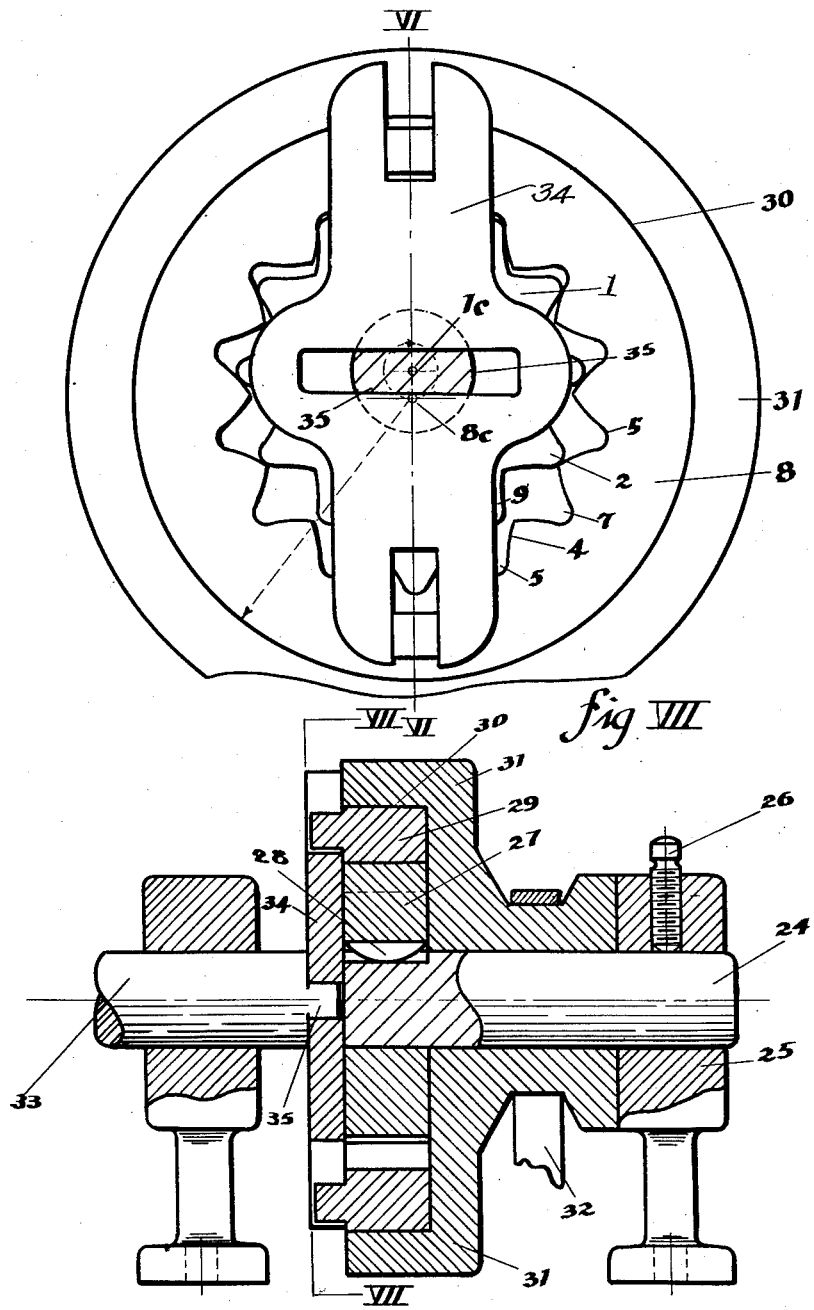
fig VIII
fig VI
INVENTOR.
Myron F. Hill Patented Aug. 31, 1937

2,091,317

UNITED STATES PATENT OFFICE 2,091,317

GEAR TOOTH CURVE

Myron F. Hill, New York, N. Y.

Application October 13, 1934, Serial No. 748,244

18 Claims. (Cl. 74—462)

My invention relates to gears and comprises a novel arrangement of tooth curves, originally developed in connection with internal rotors for motors, compressors and liquid pumps described in my U. S. Patent No. 1,682,563, granted August 28, 1928, and in my pending application 511,626, now Patent No. 2,031,888.

More particularly it employs a plurality of sets of similar teeth interposed between the original rotor teeth to form internal gears. It is applicable also to a variety of tooth ratios, the object being to provide powerful smooth running gears of small diameter and silent in operation.

It has been the practice heretofore to design gear tooth curves with relation to pitch circles. After pitch circles have been selected and located, curves crossing the pitch circles have been located by various means as in involute gears, including generation of a mating tooth curve. In so designing and determining gear tooth curves no attention has been paid to the "circroidal" addition, a factor hereinafter explained. Owing to the confusion in dictionary definitions the following terms are intended to have the meanings designated.

A circroid is a species of trochoid, employed in the geometry of tooth generation under patents granted to me hereinbefore referred to. A trochoid is any curve described by a point carried by a circle (not on its circumference) as that circle is rolled upon another circle or in it. But all trochoids are not useful in tooth generation under said patents. Only certain particular trochoids are useful. When both circles are ratio circles of gears, and the point is properly located with respect to the diameters of the ratio circles, the curve it describes may be a circroid. Each instant center of a master form used to generate a tooth curve travels along a circroid. If the point is on a radius of both circles thru a tangent point between them, the distance of the point to the tangent point is termed the "circroidal addition". When the two circles lie, one within the other, the resulting circroid is curtate and the addition has been called the "curtate-addition". But the term "curtate" does not apply to the "addition" in case the circles lie alongside of each other. The term "circroidal" addition applies to all cases.

The term "generation" in this case is intended to apply to cutting tooth curves by means of a tool carried in effect by one pitch or ratio circle as that circle rolls in effect upon another pitch or ratio circle, the tool cutting an envelope that makes contact with the tool in case both tool and envelope are rotated at uniform speeds around the centers of the ratio circles at the relative speeds of said circles. The tool is usually termed the "master tool". The process may of course be reversed.

In my Patent 1,682,563, is described a system of rotor generation having for example a master generating circle, centered outside of a gear or rotor pitch circle, generating a curve or tooth for the other rotor or gear at steady angular speed.

As described in that patent, the distance of the center of the generating circle from its pitch circle had to be great enough to prevent undercutting the tooth curves being generated. If too close to the pitch circle it was impossible to generate curves that maintained contact with a gear whose tooth curves were those of the master generating circle, at steady angular speed in the driving region.

This distance from the pitch circle, the "circroidal addition", bears a definite relation to the form of curves being generated. There is a minimum circroidal addition, greater than zero, for every curve, or every portion of a curve, having a radius greater than zero. This scientific fact has received no attention in gear design prior to my inventions in rotor and gear curves.

Heretofore gears have been actually generated by accurate machinery, which, thru failing to provide for a sufficient circroidal addition, failed to provide contact across full mesh at steady angular speed. The result of this faulty generation is hammering of teeth and at sufficient speeds, noise.

My invention in this case provides teeth for gears designed in accordance with the scientific principle referred to, so that such noise is eliminated. The form of tooth curves is also shaped for silent durable action, where before similar forms accentuated the hammering and noise.

The ratio may be any gear ratio, and the curves may be applied to internal gears, external spur or bevel gears having straight, herring bone or spiral teeth, worm, spiral, elliptical, and many other forms of gears.

In the drawings:

Fig. I shows internal gears having a 6 to 7 ratio with 12 and 14 teeth.

Fig. IA shows the original 6 and 7 tooth gear contours employed for building the gears in Fig. I.

Fig. IB illustrates how the same gear contours are revolved into the position in which they are shown superimposed upon the IA gears when the number of teeth is to be doubled.

Fig. II shows how three sets of teeth may be arranged producing an 18 to 21 tooth pair of gears, of the same tooth forms and ratio as before.

Fig. III shows a 10 to 11 ratio with 20 and 22 teeth.

Pairs of gears made according to my invention are so mated to each other that a plurality of continuous driving contacts between teeth having relative steady angular speed may result in high efficiency where one drives the other. A series of such teeth in internal gears are possible in continuously engaged driving pairs between open and full mesh, so that the driving load is distributed over a plurality of driving engagements between the teeth, with a consequent reduced pressure for each pair engaged. Reduction of gear diameters and numbers and sizes of teeth accomplish the same or better results as compared with gears now generally used.

Heretofore systems of gears in common use have been based largely upon the cycloid, the involute and the flat face tooth. All of these forms of teeth, as used, produce rubbing action on line contacts between the engaged teeth over the driving range. Attempts to design gears in which a convex face on one drove a concave face on the other resulted in binding, or, if generated, loose and noisy action.

Gear designers have apparently not understood the "looping action" of a cutting tool in its path around the pitch circle upon which the gear faces and flanks are erected, often resulting in the removal of the most important driving portions of the teeth during the generation of their curves, causing the noisy action due to variation in their relative angular speed during rotation.

The angle at which the driving surfaces lie is of less consequence than a steady rolling relation between convex and concave curves at steady angular speeds. My preferred form provides a plurality of efficient simultaneous driving engagements.

By the term "driving range" I mean the arc of contact between one tooth and the next one where the radial slip is the least at full mesh and nearest to the center line through the two gear axes, where the teeth are in driving engagement. Adjacent pairs of teeth also may be in engagement, depending on the ratios and modifications of my invention, with so little of sliding action that their driving efficiency is about equal to that of those in the aforesaid driving range. Still other teeth may engage with substantial sliding motion, and may wear more rapidly to relieve pressure so that they perform lesser driving functions except when wear occurs in the driving range, in which event such teeth may assume an appreciable part of the load. In my invention, in its best form, the wear and the load may be distributed over a plurality of driving teeth at all times, with less friction, wear, and noise than in either the involute or the cycloidal gear tooth face, or any other known gear face type.

In the drawings, I have applied my invention particularly to internal gears having ratios of tooth divisions differing by one which more clearly illustrate its principle. For example, the ratios of teeth may be 2 and 3; 3 and 4; 4 and 5; and other pairs of integers differing by unity. The tooth curves and the pitch ratio having once been determined by suitable generation in accordance with my inventions above referred to, the form arrived at may with a ratio of 1 to 2 be multiplied, producing gears with 2 and 4 teeth; 3 and 6 teeth; and so on. Other multiplied ratios produce gears having for example, 4 and 6 teeth; 8 and 12, 8 and 10; 9 and 12; and so on, as will hereinafter be referred to. In fact, in many miscellaneous ratios differing by more than one the form of tooth curves designed in accordance with the principles of my invention, is as much superior to those generally used for gearing, as it is with the above mentioned ratios.

A tooth ratio of integers differing by unity, having continuous contacts between open mesh and across full mesh, the teeth of one of which slide or roll on the tooth curves of the other everywhere, some of the tooth curves of which are free to roll or slide over each other in contact but without pressure in certain ranges, has been patented by me in U. S. Patent 1,682,563, above referred to.

My present invention in one of its forms, modifies this invention and increases the number of teeth of the two gears, while still retaining the ratio of the numbers of teeth. Teeth and tooth spaces within each tooth division of both gears may be doubled, trebled, or even further increased as found desirable. If such additional sets of teeth be uniformly inserted around the gears, the teeth of each set will coact with each other and the driving relation in each additional set of teeth on the two gears will be precisely the same as that between the original set of rotor teeth. There results however increased smoothness and greater driving power proportional to the multiplied numbers of teeth which engage near where the pitch circles are tangent. In such gear pairs it is not necessary that the supplementary sets of teeth be evenly spaced with, or of exactly the same form as, the original rotor teeth or that both sides of the teeth of the meshing gears be symmetrical or have similar curves provided each and every tooth of a set of teeth be similar to and similarly disposed with respect to the meshing teeth of that set. If these conditions be fulfilled the gears will work correctly. However, it is preferable that the teeth of all sets be symmetrical, uniform and evenly spaced or indexed to avoid the need of special care in assembling them in correct positions as would otherwise be the case. Such a pair of gears instead of having, for example 6 and 7 teeth, may have 12 and 14, 18 and 21, or 24 and 28 etc. Or if the original rotors had 10 and 11 teeth, then the new gears may have 20 and 22, or 40 and 44 teeth etc.

Under otherwise equal conditions the number of teeth engaged in driving at any one moment, and the area of tooth surfaces involved, may exceed that of other systems. It is this factor that gives these teeth greater durability and driving power, so that for a given degree of work the gears may be smaller, their centers closer together, and their casings correspondingly smaller.

It will be apparent that the load which is carried by one tooth in the original pair of rotors may be divided between two, three, four, or more teeth in the modified form, depending upon the number of supplemental sets of teeth inserted. In the use of such multiples of the original, the forms and sizes of the teeth are such as to cause them to be out of contact some distance on either side of the center line at open mesh. In pairs of the usual current types of internal gears when used for pumps, it has been found necessary to fill in such a space with a crescent shaped spacer on both sides of which the tops of gear teeth slide to retard leakage between the inlet and the outlet ports of the pump, but with my improved gear forms continuous contact during rotation between the teeth near to and on both sides of this crescent space at open mesh obviate the need of such a spacer.

Teeth of one type of gear once in general use consisted of elements of cycloids generated by a point in a circle rolling within and without the pitch circle of each gear and as will readily be seen the portions of the cycloids used for the teeth are those parts of the epicycloid and of the hypocycloid lying nearest to the pitch circles; that is, that the portions of the curves making contact over a substantial part of the driving range are those where the radii of instant curvature of the cyclids approach zero. The driving portion of these teeth is therefore mainly where their curved surfaces are sharpest, and their line contacts increase friction and wear, and shorten the life of the gears. This form of tooth has never been satisfactory and is no longer generally used.

In the generation of my tooth curves while any one of my systems of rotor generation are possible, I prefer to use trochoids outlined by a point outside of the mating pitch or ratio circle carried by the other pitch or ratio circle outside of and tangent to said mating ratio circle, as the basis of generation and to utilize considerable portions of the generated curves.

For the purpose of such generation pitch or ratio circles representing the ratio of the teeth are selected, and a circular arc adopted as a master form. The center of the arc is located on a radius of a ratio circle and outside of it, with the other ratio circle tangent to the first at the intersection of its radius. The distance of the center from the tangent point is important. Its minimum distance is determined by the size of the ratio circles and of the arc. The minimum distance is approximately the best. With a distance less than the minimum a complete mating curve is impossible since the driving curves are "undercut". The second ratio circle carrying the said center and its arc is then rolled upon the first ratio circle and an envelope is described by the arc. This envelope is the correct curve for the mating gear tooth. The whole curve need not be used, but those portions needed for the driving action. The master teeth are those having the curve of the selected arc.

With this system of generation curves for the master and mating teeth are arrived at which maintain continuous contact at uniform speed, and with a convex curve rolling into or out of a concave space curve. Such curves have minimum instant radii that are sufficiently greater than those of the sharply curved ends of cycloids as to provide easier and more durable driving relations. With the use of the multiples of the tooth ratios of my system as set forth above, the teeth may be greatly strengthened and made more durable in accordance with the multiple employed, each having the steady angular velocity ratio based on a difference preferably of unity. The minimum distances of the centers of curvature of the master tooth forms from the pitch circle upon which rolling takes place, may be determined by trial as described in my said Patent Number 1,682,563, or by a mathematical formula.

Referring now to Fig. I, which shows internal gears having a ratio of 6 to 7, the inner gear 1 has 12 teeth and the outer gear 8 has 14 teeth, the centers of the two gears being indicated at 1c and 8c. In designing these gears the generation system described in my aforesaid patent has been employed and the generating machine set forth in the patent granted to Hugo Bilgram and myself, U. S. Patent No. 1,798,059, is useful. Thus we have a pair of gears of 6 to 7 ratio with 12 and 14 mated teeth which will run together with the same properties as the original 6 to 7 set but with double the number of driving contacts. Additional sets of teeth may be added in a similar manner. This is shown in Fig. II, in which each tooth division is provided with three teeth, having three times as many driving contacts. My patents describe "tooth divisions" based upon a ratio differing by one. The same tooth divisions are described in this case, each containing not one tooth but two or more.

While a variety of tooth curves are of practical value in the use of my invention, I prefer to use the prepicroid system of tooth generation with a circular arc as a suitable curve with which to generate the gear contours. The term "prepicroid" is a word comprising parts of the phrase "parallel to epicircroid" and of course refers to such a curve. I preferably differentiate between the curves that I use and those curves possible for teeth of the same height, such as the simple cycloidal type with sharp driving curvatures which are not durable and now considered generally unusable. That is, I use curves in which the least instant radius of curvature is appreciable and not those in which the radii of curvature diminish to zero, as in a simple cycloid.

Referring again to Fig. I, it will be noted that the set of teeth 2 and 4 and spaces 3 and 5 correspond to the positions of rotor teeth shown in Fig. IA. Likewise the set of teeth and tooth spaces, 6, 7, 9 and 9a in Fig. I correspond to the positions in Fig. IB. Superimposing the set of tooth contours in the position IB on the set in IA produces the gears shown in Fig. I.

In Fig. II three sets of teeth and tooth spaces, with the same relation, are shown. The added teeth of the inner gear 4b and 4c are placed in one original tooth division, which is indicated by the arc 4a; and added tooth spaces in the outer gear are indicated at 4d and 4e, in the original tooth curve 4f. The curves of all sets are preferably duplicates and evenly indexed in which case there is freedom of assembly in any relative gear position.

In order to produce my preferred form of gear teeth, a blank for the inner gear curve may be mounted on the aforesaid generating machine in my Patent 1,798,059, the two worm shafts being geared directly together to rotate in opposite directions from each other at the desired speed ratio, and a milling cutter having a diameter large enough to generate the narrow tooth shape shown, is adapted to cut the blank. The blank may be of tool steel suitable for subsequent hardening. A contour is generated in accordance with the principles set forth in my Patent No. 2,031,888 so that the six tooth gear contour outlined by the tooth curves 2 and the corresponding tooth spaces 3 results. This tool may be hardened and employed to generate the teeth on the outer gear, using a Fellows gear shaper by disconnecting the backing off mechanism and the steady feed, and feeding the slowest Fellows gear ratio drive intermittently (by hand if need be) between cutting strokes. A blank is prepared shaped roughly to such contours so that the first entering cut is not too heavy or severe. The seven space contours 3 and the corresponding teeth as shown on the outer gear form in Fig. IA are thus generated. The gear tool is then rotated angularly around its pitch circle into a position with relation to the blank to cut the second series of seven space curves 5 in the outer gear, thus dividing each tooth 4 into two teeth. The blank for the outer gear 8 is preferably previously rough machined so as to make the first or entering cuts easy ones. If this blank be made of tool steel it may then be hardened and used as a shaper tool to generate the inner gear 1 directly with its two sets of tooth contours 2 and 9, either in the Bilgram-Hill generator above referred to, or in a Fellows gear shaper as described above.

Additional sets of teeth may be found in the same way as is shown in Fig. II, where each tooth division has three teeth. It is not essential that the indexing of the extra sets of teeth be such as to locate the added series of contours evenly indexed between the first series, since whatever variation exists in one gear for generation is repeated in the generated gear. In these multiplied ratios the teeth of one set of curves on one gear never engage other than the respective teeth of that set on the other gear if they are assembled in the original generated relation. In Fig. I contours 2 and 4 engage only contours 3 and 5, so that even if the indexing be not even as between the original set and the added teeth they will always engage correctly if they have been assembled in the generated relation. However, if the teeth are duplicates and have been evenly indexed they may be assembled in any position so that it is better in practice to make the teeth duplicates and the indexing uniform throughout. In case the generated teeth are undercut, the circroidal addition is too small, and, as indicated in my Patent Number 1,682,563, should be increased until undercutting ceases.

The result of these contours is that in Fig. I, one side of a tooth 4 travels with a sliding contact on tooth 2 from A to B, and can drive it in a clockwise direction. Or tooth 2 could drive tooth 4 in an anti-clockwise direction from B to A. This is a continuous contact having at full mesh the greatest amount of rolling action in this gear as well as the largest relative area of contact between the teeth so far achieved, due to the convex tooth curve 4 rolling on the generated concave curve 3, at steady angular speed. Between B and C the contacts have nearly a pure rolling contact since the pitch circles lie closest together. The wear within this range is so slight as to be negligible over long periods of time. The wear from A to C is more rapid since the contact becomes more and more a sliding line contact as they approach open mesh.

As the gears travel in a clockwise direction the teeth part at B and the driving load is carried at D and C. To the left of C, the contact is such that ever sharper convex curvatures toward open mesh engage with line contacts. Between C and B the driving contact is distinctive in my system as there are at least two convex tooth curves simultaneously engaging concave tooth space curves at steady speed and if greased with substantial pressure areas. At D and B for example the presence of a lubricating film results in the distribution of the working pressure over a wide area, due to the face of one tooth lying closely against the flank of the other. In fact there is a plurality of teeth under the driving load having this ideal relation to an extent.

Also, the pressure angle of continuous contact varies, due to the area of contact traveling along a tooth curve. The radial slide between them as they travel from C to D and from D to B is slight, owing to the close proximity in these regions of their pitch circles 2a and 5a to the point of tangency. Angles of pressure with my system are important factors in reducing radial sliding action between the teeth. E indicates where the teeth of one gear begin to leave the teeth of the other gear as they approach open mesh when revolution is clockwise. Up to this point E, however, the teeth may maintain tight relations. The engagements between teeth having driving relations of value equal to other systems near full mesh, may in my system extend simultaneously over nearly a quadrant, and actually engage more or less, depending upon numbers and ratios of teeth, nearly half a circle. Such compound engagements cut actual pressure per unit of area to a small amount, and provide great resistance to damage from shock.

Certain modifications of this system of gearings are possible. While such modifications involve some sacrifice of some of the new results described they do not sacrifice all of them, since the system may be utilized with a Fellows gear shaper to generate many other desirable ratios of teeth at steady speed as for instance, three to seven, thirteen to seventeen, etc.

Looking at my invention from another angle, small teeth on a generating form having faces with a curvature greater than zero at the pitch or ratio circle, may be selected for purposes of generation. Such a tooth may be bisected on the radius of its pitch circle and the two parts then separated angularly on the ratio circle, other curves perhaps similar being inserted to complete the teeth, and such a compound form used to generate the mating gear. The centers of curvature have to be so disposed outside of the pitch circle of the generated gear in accordance with my invention to prevent undercutting the engaging driving faces of the generated mating teeth. Many variations of such a method are possible, and it is applicable to external gears, worms, mitre, skew, helical, elliptical and mongrel forms of gearing.

In Fig. II the pitch circles are shown at 4g and 4i.

My invention of multiplied teeth makes it further possible to affect delivery capacity when the gears are used as pumps, by changing the ratio and the eccentricity. For the purpose of comparison we may consider for example a pump of the internal rotor type having a given eccentricity and a given outside diameter of tooth curve of the driving rotor. If the rotors have 6 and 7 teeth respectively, the capacity is determined by the area of an annulus whose outside diameter is the outer diameter of the generated curve of the driving rotor and whose inner diameter is the inner diameter of the generated curve of the same rotor. If the 6 and 7 teeth be doubled to 12 and 14 teeth by interposing the additional sets of teeth as described in my invention, an open space appears across open mesh due to the cutting off of top portions of the teeth, 6, of one gear. This reduces the capacity of the pump roughly about twenty per cent in this ratio.

The capacity of rotors having the same outside curve diameter may, however, be actually increased by means of the multiplied teeth. By doubling the eccentricity and diameters, the area of the annulus is doubled increasing capacity four times. Next if the tooth ratio be changed and instead of 6 and 7 tooth gears we use a 3 to 4 ratio with the same doubled eccentricity, the diameters are again reduced to nearly those of the 6 and 7 tooth gears having the lesser eccentricity, in which case the capacity is still about double that of the original 6 and 7 tooth rotors. By doubling the number of teeth of the 3 to 4 ratio, that is, by inserting a supplementary tooth within each tooth space of one rotor and a corresponding tooth space in each tooth of the other rotor, making two teeth to fill the space of one, that is 6 and 8 teeth, the capacity, even though the original tooth height be reduced to accommodate the increased number of teeth is still approximately sixty per cent more than the original 6 and 7 tooth rotors, and the new 6 and 8 tooth rotors have much the same qualities of durability, smoothness of operation and large contact area as the original 6 and 7 tooth rotors.

Conversely, by properly proportioning all of the elements of the 6 and 8 tooth unit so that the capacity will be equal to the capacity of the 6 and 7 tooth rotors the gears and consequently the pump may be made considerably smaller.

In the matter of speed at which such a 6 to 8 toothed pump may be operated, a distinct advantage is gained by my invention. For example, with the 6 and 7 tooth rotors, using the inner gear as a driver, if the inner gear runs at 1800 revolutions per minute, the outer gear runs at six sevenths of 1800 or 1543 revolutions per minute; whereas with the 3 and 4 tooth gear ratio using 6 and 8 teeth, the inner gear may run at a speed of 1800 revolutions per minute while the outer rotor speed is reduced to three fourths or 1350 revolutions per minute. When maximum speeds are limited to the centrifugal strength of the outer rotor, the gears may have correspondingly greater speed and capacity.

In order to secure my new results, I base the curves in my preferred form upon my said patent and more specifically upon the invention claimed in my Patent 2,031,888. In that invention the relatively large master circle in relation to the eccentricity and number of teeth, reduces the width of the pinion tooth and the width of the tooth space of the outer rotor with a corresponding widening of the tooth spaces of the inner rotor and of the tooth of the outer rotor. Such curves were originally proportioned so that the master circular form of the crown of the outer rotor tooth would be preserved during wearing in, the crowns of the inner teeth being burnished to fit them. Now it is discovered that such curves make room for one or more additional sets of teeth interposed in the pinion, angularly displaced so that the second set of teeth occupies part of the widened tooth space curve on the inner rotor. When one extra set is added it is preferably in the middle, and a corresponding tooth space is made in the widened tooth of the outer rotor. This doubles the number of teeth and more than doubles their durability. Other additional sets of teeth may likewise be interposed correspondingly multiplying the number of teeth and tooth spaces in the two gears and their durability. Each set may be of a different system such as cycloidal, phydocroidal, prepicroidal, or mongrel oval; or one side of a set may be of one such combined system and the other sides may be of other systems unsymmetrical thereto. In each case, after selecting a master tooth form from one or more curves or combinations of curves the mating teeth are generated in accordance with the novel principles hereinbefore set forth. In this case I prefer the prepicroidal curves throughout, symmetrical on both sides of teeth. The term "phydocroid" is a word made up of parts of the phrase "parallel to a hypocircroid" and has a corresponding meaning.

It will be noted that the particular contours of the gear teeth shown and described in detail in this case may have their working faces lying across (Fig. I) or outside of (Fig. II) their respective pitch circles, without losing their radial heights. To obtain this result with teeth designed upon the usual pitch circle system would mean that the tooth curves would be limited to addendums and of less radial height. They travel nevertheless at the relative speeds of their pitch circles making up in angular sliding action whatever they may lack in pure roll. This factor may or may not be employed, but it is sometimes of value in machine design. No limitation to this particular location is intended. In fact in the drawings relations of circroidal addition and outer tooth or master tooth curve are shown where the driving curve or surface extends across the ratio circle, a novel feature for gears that maintain constant contact at uniform speeds.

When simple cycloidal curves are employed, their tips, resting on their pitch circles may be cut off or left to engage beyond the normal "driving range", which is an arc of an angular distance approximately equal to the distance from a point on one tooth of a gear to the corresponding point on the next tooth of that gear; that is, about equal to the circular pitch; so that all the tooth driving surfaces upon which durability depends within said range have curvatures greater than the curvatures of the ends of the cycloids whose instant radii diminish to zero. If simple circroids are employed, the curves do not have the sharp portions of cycloids at their pitch circles and are therefore more durable. Curves, equidistant from circroids as in the figure, have similar desirable curve qualities. Curves not equidistant but generatively based upon circroids (as when an ellipse, oval, or odd form is substituted for the generating circle described in my aforesaid patents) may be designed to have similar effects. All such variations lie within the scope of my invention.

Both sides of a tooth 2 and 4 are shown as symmetrical. If one side has a different generative curve relation from that shown, the gears will still drive in either direction. Or if one direction gears only are needed the faces providing the driving action in the direction desired will have the invention above set forth, while the other non-driving sides may have their surfaces so relatively cut away as to fail of contact. But in designing such cut away sides, the normal curve of one gear, generated by the tooth form of the other gear, must be known in order to know where or how to undercut such tooth sides to eliminate the generative contact and avoid causing clashing between the surfaces of those sides during rotation.

The several systems of tooth curves described herein may be inter-mixed on different teeth, or on different sides of the same teeth, or both, without departing from the scope of my invention, either in internal or external gears. This includes rotors differing by one tooth.

Portions only, of the aforesaid curves may be used, particularly where centrifugal force or inertia may be depended upon to make up for what the portions might lack in maintaining steady angular speed of one with relation to the other.

As the construction features herein described are capable of many changes and widely different embodiments in different forms of gears, internal, spur, bevel, spiral, helical, worm, and so on, may be made without departing from the scope hereof, it is intended that all the matter contained in the above description and shown in the accompanying drawings shall be interpreted as illustrative and not in a limiting sense. It is also intended that the terms of the claims and all statements of the scope of the invention are intended to cover all the generic and specific features of my invention described herein.

What I claim is:

1. In a pair of toothed internal gears, one within, eccentric to, and having at least two less teeth than the other, said gears having cooperating teeth in sets, a plurality of such sets in each pair of gears, the sets of teeth in the two gears differing by one set, the curves of each tooth comprising selected portions of curves characterized by a radial height from the hollow of a tooth space to the top of a tooth substantially equal to twice the eccentric distance between the gear axes, and the contours of said curves, including tooth spaces, characterized by a difference of one set and having a generative relation to each other maintaining continuous contact at uniform angular speed.

2. In a pair of toothed gears, the teeth of one gear having convex working curves in fixed relations to the respective pitch circles of that gear, meshing with correspondingly fixed concave working curves on the other gear, mutually generative at steady angular speed, said gears having co-operating teeth in sets, a plurality of such sets in each pair of gears, the sets of teeth in the two gears differing by one set, the curves of each tooth comprising selected portions of curves characterized in theory by a radial height from the hollow of a tooth space to the top of a tooth substantially equal to twice the eccentric distance between the gear axes, and the contours of the teeth of a set, including tooth spaces, characterized by a difference of one set and having a generative relation to each other, maintaining continuous engagement at steady angular speeds.

3. The combination claimed in claim 1 having convex faces for the teeth of one gear and concave faces for the teeth of the other gear, the convex faces being upon the outer gear.

4. In a pair of gears an internal gear eccentric to an external gear, and one of said gears characterized by having one less basic tooth division than the other, the driving surfaces of each tooth having a curve based on a radial height from the hollow of a tooth space to the top of a tooth substantially twice said eccentricity, and the faces and flanks of the teeth of said gears having their driving contours generated one by the form of the other at uniform angular velocity, each basic tooth division comprising a plurality of teeth of similar form, all teeth of one gear having a continuous driving contact with the teeth of the other gear throughout their driving relation.

5. A pair of gear members having teeth arranged with relation to their pitch lines, the teeth on one member having selected contours so located with relation to its pitch line that their instant centers of curvature are disposed on that side of said pitch line away from the other gear member and at such a distance as to provide continuous contact between said tooth contours and mated contours on the other gear member at uniform angular speed, the tooth driving curves on one gear being convex exclusively, and those on the other gear being concave, with a generative relation to said convex curves.

6. In internal gears, rotary toothed members having basic tooth divisions differing in number by one, each tooth division comprising a plurality of teeth, the eccentricity being that of the basic tooth division ratio, driving surfaces on said teeth of the two gears maintaining a continuous drive at steady angular speeds determined by said basic ratio, driving tooth contours on the two gears having a generative relation maintaining continuous engagement between them for said continuous drive, the driving contour of said mated tooth so characterized that, continued over the convex top of a mated tooth, it has a curvature of varying instant radii.

7. The combination in claim 6, having for a driving curve of outer gear teeth a circular arc.

8. The combination in claim 6, having tooth curvatures of one gear widened and those on the other teeth narrowed whereby "running them in" tends to reduce narrow teeth and not to affect the wide teeth, thereby maintaining the curves as designed.

9. The combination in claim 6, the driving curves of one of said members being side-stepped angularly to provide back lash without departing from generative relations.

10. The combination in claim 6 having the continuous drive extending on both sides of the center line at full mesh, the driving contours being more intimately meshed where radial slip is greater on one side of said center line.

11. In a gear pair having a difference in number of teeth greater than one, selected driving curves upon the teeth of one gear, and mated driving curves generated at uniform angular speed upon the teeth of the other gear, the centers of curvatures of said selected teeth located outside the pitch or ratio circle of that gear at sufficient distance to provide a continuous driving contact.

12. In a gear pair having a difference in number of teeth greater than one, selected driving curves upon the teeth of one gear, and mated driving curves generated at uniform angular speed upon the teeth of the other gear, the centers of curvatures of said selected teeth located outside the pitch or ratio circle of that gear at sufficient distances to provide continuous driving contact, said driving curves crossing their ratio circles without reversing.

13. In a gear pair having a difference in number of teeth greater than one, selected driving curves upon the teeth of a first gear, and mated driving curves generated at uniform angular speed upon teeth of a second gear, the center of said selected tooth curvatures traveling outside of the pitch or ratio circle of the second gear at distances not less than to provide continuous driving contact.

14. The combination claimed in claim 13, having as said selected curves, circular arcs.

15. The combination in claim 13, having said selected curves crossing the ratio circles of the first gear without reversal.

16. The combination in claim 13, the driving curves of one of said gears being side-stepped angularly to provide back lash without departing from generative relations.

17. The combination in claim 13 having convex driving curves on one gear rolling against concave curves on the other gear during rotation, both inside and outside of the ratio circles of said gears.

18. In a gear pair having a difference in number of teeth greater than one, selected driving curves upon the teeth of a first gear comprising unreversed curves lying across its ratio circle, and mated curves upon a second gear generative of said selected curves at uniform angular speed, the centers of curvatures of said selected curves travelling outside of the pitch or ratio circle of the second gear at distances not less than to provide continuous driving contact between the teeth of said gears across full mesh in the driving range.

MYRON F. HILL.